US012088625B2

(12) United States Patent
St. Pierre (10) Patent No.: US 12,088,625 B2
(45) Date of Patent: Sep. 10, 2024

(54) SLOWING REQUESTS FROM MALICIOUS NETWORK CLIENTS

(71) Applicant: Arbor Networks, Inc., Westford, MA (US)

(72) Inventor: Brian St. Pierre, Acworth, NH (US)

(73) Assignee: ARBOR NETWORKS, INC., Westford, MA (US)

( * ) Notice: Subject to any disclaimer, the term of this patent is extended or adjusted under 35 U.S.C. 154(b) by 178 days.

(21) Appl. No.: 17/807,627

(22) Filed: Jun. 17, 2022

(65) Prior Publication Data

US 2023/0231873 A1   Jul. 20, 2023

Related U.S. Application Data

(60) Provisional application No. 63/300,884, filed on Jan. 19, 2022.

(51) Int. Cl.
*H04L 9/40* (2022.01)
*H04L 61/4511* (2022.01)
*H04L 67/145* (2022.01)

(52) U.S. Cl.
CPC ...... *H04L 63/1458* (2013.01); *H04L 61/4511* (2022.05); *H04L 63/1416* (2013.01); *H04L 63/1425* (2013.01); *H04L 63/1441* (2013.01); *H04L 67/145* (2013.01)

(58) Field of Classification Search
CPC ............ H04L 61/4511; H04L 63/1416; H04L 63/1425; H04L 63/1441; H04L 63/1458; H04L 67/145
See application file for complete search history.

(56) References Cited

U.S. PATENT DOCUMENTS

| 8,613,089 | B1  | 12/2013 | Holloway et al. |
| 8,800,039 | B2* | 8/2014  | Yoon ............... G06F 21/554 |
|           |     |         | 713/188 |
| 2012/0216282 | A1* | 8/2012 | Pappu ............ H04L 63/1408 |
|           |     |         | 726/23 |
| 2018/0302438 | A1  | 10/2018 | Robertson |
| 2020/0137021 | A1  | 4/2020  | Janakiraman |
| 2021/0168173 | A1* | 6/2021 | Compton ......... H04L 63/1416 |

* cited by examiner

*Primary Examiner* — Gil H. Lee
(74) *Attorney, Agent, or Firm* — Foley & Lardner LLP (57) ABSTRACT

A method and network are provided for monitoring a network during a DDoS attack. The method includes establishing a flow record for flows designated for tarpitting and a state machine, each state of multiple states of the state machine having an associated handler function. The handler function associated with a current state of a state machine associated with a flow is invoked to perform one or more actions associated with the flow or the flow record for applying at least one tarpitting technique of one or more candidate tarpitting techniques associated with the flow record, and return a next state, which is used to update the current state of the state machine. The handler function associated with the current state of the state machine is repeatedly invoked, wherein each invocation of the handler function potentially applies different tarpitting techniques.

22 Claims, 8 Drawing Sheets

SLOWING REQUESTS FROM MALICIOUS NETWORK CLIENTS

CROSS REFERENCE TO RELATED APPLICATIONS

This application claims priority to U.S. Patent Application Ser. No. 63/300,884 filed Jan. 19, 2022, which is incorporated herein by reference in its entirety.

BACKGROUND

1. Field of the Disclosure

The present disclosure relates to network security, and more particularly, to a system and method for formulating responses that reduce the rate of requests from malicious network clients.

2. Description of Related Art

Application layer distributed denial of service (DDoS) attacks (also referred to as application attacks) utilize valid requests, often from non-spoofed IP addresses to attack an application itself, focusing on specific vulnerabilities or issues of the application. The requests are designed to consume resources on the target system, making it so that the target system becomes degraded or unusable by legitimate users. Once detected, an attack can be mitigated by preventing packets from an attack to its target by dropping the packets. However, this technique may signal the attacker that the attack has been detected and is no longer working, causing the attacker to either change the attack technique, switch to a different source, or otherwise avoid dropping of the packets from the attack. A more naive attacker may simply continue to resend requests that were dropped, thus consuming bandwidth of a device performing the mitigation.

Application attacks need to be performed by intelligent devices that have the ability to conform to a protocol of an application being attacked, which can include conforming to protocol handshakes and protocol/application compliance. With the proliferation of insecure internet-of-things (IoT) devices in recent years that have such capabilities, there is risk of an increase in application attacks.

While conventional methods and systems have generally been considered satisfactory for their intended purpose, there is still a need in the art for a method of thwarting application attacks without alerting the attacker.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method of monitoring a network during a DDoS attack. The method includes receiving packets included in the attack, determining whether the packets are designated for tarpitting, for each packet from a source determined to be designated for tarpitting, assigning the packet to an existing or newly established flow and for each newly established flow, establishing a flow record, wherein the flow record stores data that affects timing and/or types of transmissions related to the flow. For each flow having a flow record, a state machine configured to change between multiple states is established, wherein each of the multiple states has an associated handler function. The handler function associated with the current state of a flow's state machine is invoked. The handler function, upon being invoked, is configured to perform one or more actions associated with the flow or the flow record for applying at least one tarpitting technique of one or more candidate tarpitting techniques associated with the flow record, and is further configured to return a next state. The method further includes updating the current state of the flow's state machine to be the next state returned by the handler function and repeating invocation of the handler function associated with the current state until the current state is a closing state, wherein each invocation of the handler function associated with the current state potentially applies different at least one tarpitting techniques.

In one or more embodiments, the one or more action can include at least one of transmitting a transmission related to the flow, enqueuing a transmission related to the flow, modification of one or more fields of the flow record for a future transmission related to the flow, and updating counters and/or statistics associated with an action of the one or more actions performed, wherein updates to the counters and/or statistics potentially affect future actions.

In one or more embodiments, the flow record can include a protocol mask indicative of a protocol used by the flow, and the candidate tarpitting techniques can be selected from a catalogue of multiple tarpitting techniques, each of the multiple tarpitting techniques having a protocol indicator indicative of a protocol to which the tarpitting technique is suitable to be applied, wherein the candidate tarpitting techniques selected from the catalogue each have a protocol indicator that matches the protocol mask of the flow record.

In one or more embodiments the method can further include selecting, using a randomization function, the at least one tarpitting technique from the one or more candidate tarpitting techniques.

In one or more embodiments the method can further include applying a randomization function for setting a variable applied by the handler function, wherein the variable is associated with adjustment of a parameter associated with the flow or flow record.

In one or more embodiments, the parameter associated with the flow record can include a timestamp value, wherein the timestamp value indicates a time when a next transmission associated with the flow should be transmitted.

In one or more embodiments, the handler function associated with the current state of the flow's state machine can be invoked in response to an event, wherein an event is either caused by a timer having a time that matches a timestamp value of the flow record or receipt of a packet of the flow.

In one or more embodiments, adjustment of the parameter associated with the flow record can cause delay of a transmission of a response to a received packet, wherein the parameter is adjusted for the delay to be less than a value that would trigger a client timeout.

In one or more embodiments, the one or more action can include updating counters and/or statistics associated with a host record, the host record being associated with an IP address of a source of the packet, and updating counters and/or statistics associated with the host record affecting treatment of the packet and/or future treatment of packets received from the host record in the future.

In one or more embodiments the multiple tarpitting techniques can include two or more of responding to the received packet with a response that is delayed by a selected delay interval and responding to the received packet with a selected error message. Also, when a packet of the packets received uses transmission control protocol (TCP), the two or more tarpitting techniques can include responding to the received packet with numerous responses each having a small portion of the full response, responding to the received packet with a message having a bad TCP checksum, setting a TCP window size to a selected small value, and/or responding to the received packet with a message that does not include acknowledgement data. Also, when a packet of the packets received domain name system (DNS) and the received packet is a query that uses user datagram protocol (UDP), the two or more tarpitting techniques can include responding to the received packet with a truncated response. Also, when a packet of the packets received uses a protocol with an authorization component, the two or more tarpitting techniques can include responding to the received packet with a message that authorization is required or failed. Also, when a packet of the packets received uses hypertext transport protocol (HTTP), the two or more tarpitting techniques can include responding to the received packet with an error code or a success code and a page body that creates an expectation of with a relatively large page body content-length, responding to the received packet with an error code or a success code and a page body without a content-length such that such page is of an indefinite size, and/or responding to the received packet with a JavaScript link to a JavaScript resource, wherein the JavaScript link or JavaScript resource use a tarpitting technique.

In one or more embodiments the multiple tarpitting techniques can include two or more of responding to the received packet with a response that is delayed by a selected delay interval, wherein the parameter adjusted is the selected delay interval, and responding to the received packet with a selected error message, wherein the parameter adjusted is which error message, selected from a predetermined collection of error messages, is sent. Also, when a packet of the packets received uses TCP, the two or more tarpitting techniques can include responding to the received packet with numerous responses each having a small portion of the full response, wherein the parameter adjusted is a number of bytes and/or a selection of which bytes to be included in the small portion, and/or setting a TCP window size to a selected small value, wherein the parameter adjusted is the TCP window size. Also, when a packet of the packets received uses a protocol with an authorization component, the two or more tarpitting techniques can include responding to the received packet with a message that authorization is required or failed, wherein the parameter adjusted is whether the message is that the authorization is required or failed. Also, when a packet of the packets received uses HTTP, the two or more tarpitting techniques can include responding to the received packet with an error code or a success code and an advertised or unadvertised page body that creates an expectation of a relatively large page body, wherein the parameter adjusted is whether the page body size is advertised and the page body size advertised, when advertised, and/or responding to the received packet with a JavaScript link to a JavaScript resource, wherein the JavaScript link or JavaScript resource use a tarpitting technique, wherein the parameter adjusted is a page size of a page including the JavaScript link and/or selection of the tarpitting technique used by the JavaScript link or JavaScript resource.

In accordance with further aspects of the disclosure, a computer system is provided that performs the disclosed method. In accordance with still further aspects of the disclosure a non-transitory computer readable storage medium and one or more computer programs embedded therein is provided, which when executed by a computer system, cause the computer system to perform the disclosed method.

In accordance with further aspects of the disclosure, one or more network monitors are provided that include a memory configured to store instructions and at least one processing device disposed in communication with the memory, wherein the at least one processing device upon execution of the instructions is configured to perform each of the respective disclosed methods. In accordance with still further aspects of the disclosure non-transitory one or more computer readable storage mediums and one or more computer programs embedded therein are provided, which when executed by a computer system, cause the computer system(s) to perform the respective disclosed methods.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
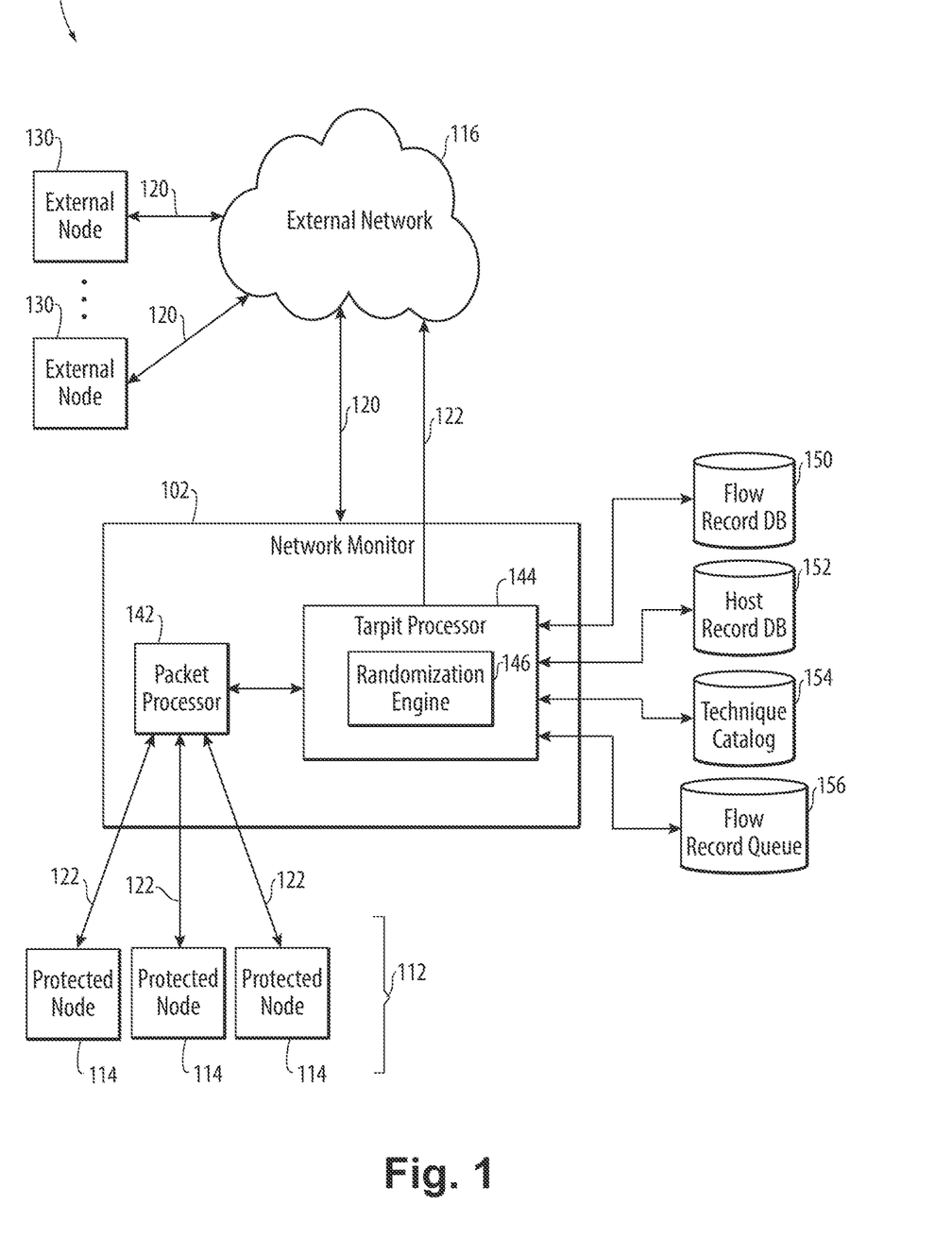
FIG. 1 illustrates a block diagram of an example network system having a network monitor with a tarpit processor, in accordance with an aspect of the disclosure.

Reference will now be made to the drawings wherein like reference numerals identify similar structural features or aspects of the subject disclosure. For purposes of explanation and illustration, and not limitation, a block diagram of an exemplary embodiment of a network system 100 in accordance with the disclosure is shown in FIG. 1 and is designated generally by reference character 100. Methods associated with slowing requests from malicious domain name system (DNS) clients during network communication with a protected network of the network system 100 in accordance with the disclosure, or aspects thereof, are provided in FIGS. 2-9, as will be described.

With reference now to FIG. 1, network system 100 includes a network monitor 102 that detects and mitigates attacks directed at a target in one or more protected networks 112, each protected network having one or more protected nodes 114. External nodes 130 can communicate with protected nodes 114 via an external network 116. Communication between one of the protected nodes 114 and one of the external nodes 130 can be in accordance with a client/server model, in which one of the protected node 114 and the external node 130 functions as a client that requests a service, and the other of the protected node 114 and the external node 130 functions as a server that responds to the client for providing the requested service. Network monitor 102 monitors network traffic to and from protected nodes 114 of the one or more protected networks 112, such as for analyzing request traffic output by external nodes 130 to protected nodes 114. The network monitor 102 includes or accesses a packet processor 142, a tarpit processor 144, a flow record database (DB) 150, a host record DB 152, a technique catalog 154, and a flow record queue 156.

Packet processor 142 is configured to process packets from external nodes 130, such as for detecting whether the packets are included in an application attack. When the packets are determined to be not included in an attack, the packet processor forwards the packets to protected network 112. However, when the packets are determined to be included in an attack, the packet processor forwards the packets to tarpit processor 144. The external node 130 that is a source of the packet determined to be included in the attack is referred to below as an attacker.

The objective of tarpit processor 144 is to leverage predictable behavior by the attacker in response to network failure or slowness by simulating network failure or slowness. When network failure or slowness is simulated, this can appear to the attacker as if the attack is working. The attacker can interpret the simulated network failure or slowness as failure by the target that was caused by the attack. Tarpitting techniques are used to simulate the network failure or slowness. These tarpitting techniques have a secondary effect of slowing down a rate of requests by the attacker. Further objectives include preventing the attacker from being able to resolve an IP address of its ultimate target(s), wherein the ultimate target is the computer handling the resolved IP address; and preventing the attacker from having the ability to flood a DNS server of a protected node 114 by redirecting the attacker in a way that causes the attacker to waste time without wasting any of the target server's or network's resources. For example, if it has been determined that the DNS request is from the attacker, the response to the DNS request can be an IP address controlled by the tarpit processor 144 instead of the IP address that would normally be resolved. In another example, the response can include tarpitting errors.

Most application-layer protocols (e.g. hypertext transfer protocol (HTTP), session initiation protocol (SIP)) rely on domain name system (DNS) servers to convert human-friendly hostnames (e.g., www.example.com) into machine-friendly internet protocol (IP) addresses (e.g., 198.51.100.42). If an attacker wants to target a webserver serving a website the attacker is likely to perform a DNS request to get the IP address.

Based on this reliance of application-layer protocols on DNS, tarpit processor 144 uses one or more tarpitting strategies. The tarpitting strategies can be used individually, combined, and/or parameters can be adjusted. Tarpit processor 144 includes or accesses a randomization engine 146 that can randomize selection of tarpitting strategies and/or which parameters are adjusted or the settings to which the parameters are adjusted.

Tarpit processor 144 uses a finite state machine. For each connection, tarpit processor 144 creates a flow record. Each connection identifies a connection between a source and a destination, e.g., the 5-tuple (source IP address, destination IP address, layer 4 protocol, source port, destination port), that is tarpitted by tarpit processor 144. The flow record includes a field that records the current state of the connection. All of the flow records are stored in a data structure, such as flow record DB 150.

One tarpitting technique causes transmission delays. Each flow record is provided with a timestamp field that is used to introduce a transmission delays, flow records contain an additional field that has a timestamp indicating when another packet should be sent as a response to the external node 130. Pointers to flow records that have this timestamp set are sorted by the timestamp and saved in flow record queue 156. A flow record can have multiple timestamps for staggering transmission of the same packet at multiple different times, such that multiple pointers for the same flow record can be added to flow record queue 156. A timer signal fires periodically, which triggers the tarpit processor 144 to check flow record queue 156. Any flow records having a timestamp equal to the current time or older are processed and removed from flow record queue 156 for transmission to external nodes 130.

Figure 9:
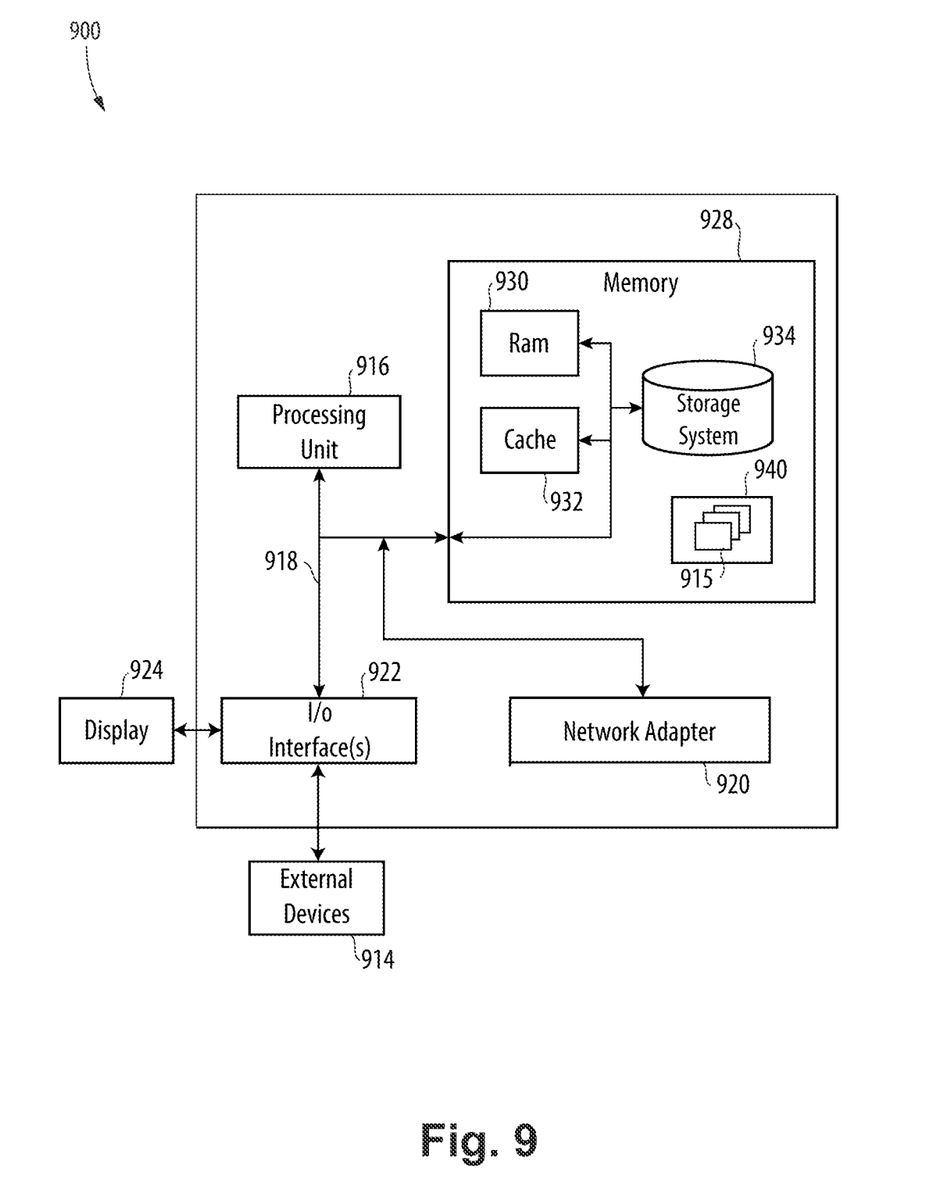
FIG. 9 illustrates an example computing system that could be used to implement a network monitor, as shown in FIG. 1, in accordance with an embodiment of the disclosure.

With reference to architecture of network monitor 102 and its related storage, network monitor 102 includes a central processing unit (CPU), random access memory (RAM), and a storage medium, which can be connected through buses and used to further support the processing of the received packets, as shown and described with respect to FIG. 9. Programmable instructions can be stored in the storage medium and executed by the CPU to cause the CPU to perform operations described herein. Network monitor 102 can be implemented as physical or virtual devices. Whether implemented as physical or virtual device(s), network monitor 102 uses a local or remote hardware processing device that executes software instructions, which enables performance of the disclosed functions.

Each of packet processor 142 and tarpit processor 144 can be accessible by network monitor 102, and can be integrated with or external from network monitor 102. In addition, each of packet processor 142 and tarpit processor 144 can be implemented using software, hardware, and/or firmware. Packet processor 142 and tarpit processor 144 can be configured as different processes and/or as distinct computing devices, or packet processor 142 and tarpit processor 144 can be a single process or executed on a single computer. Functionality and/or components packet processor 142 and tarpit processor 144 can be shared or divided amongst packet processor 142 and tarpit processor 144 in a variety of ways.

Protected network 112 supports communication between protected nodes 114. Protected network 112 can include one or more networks, such as an intranet, a local area network (LAN), and/or a wide area network (WAN). In examples, protected network 112 can be an enterprise network, such as a school network, business network, and government network, to list a few examples, that can connect to the Internet. The external network 116 can include one or more WANs, e.g., the Internet, which may be used to access protected network 112.

In embodiments, at least portions of the network monitor 102 are located between the external network 116 and the protected network 112. In other embodiments, at least portions of the network monitor 102 are located within the external network 116 or protected network 112. At least portions of the network monitor 102 can be located at a network edge (inside or outside of the protected network 114) or deeper within the protected network 112.

In the example shown, one protected network 112 is shown, however one skilled in the art will recognize that the network monitor 102 can provide a protection service to multiple protected networks 112. Similarly, the number of protected nodes 114 per protected network is not limited to a particular number.

Packet processor 142 of network monitor 102 includes or communicates with hardware, firmware, and/or software components that are configured to observe content of packets included in network traffic. Packet processor 142 can include central or distributed elements for observing, intercepting, and/or analyzing network data. These elements can be passive or active and include software, firmware, and/or hardware components, such as taps, probes, or port mirrors. These elements can be positioned inline, and/or remote relative to communication links 120 and 122.

Each of protected nodes 114 and external nodes 130 can be a computing device such as a server, laptop device, network element (such as routers, switches, and firewalls), embedded computer device that is embedded in other devices, such as appliances, tools, vehicles, or consumer electronics, mobile devices, such as laptops, smartphones, cell phones, and tablets. The protected nodes 114 and external nodes 130 can each operate as a client or as a server in a client/server exchange that uses a client-server protocol. The disclosure is directed to scenarios in which an external node 130 operates as a client and submits a request (such as a DNS request and/or request using a protocol, such as TCP, HTTP, internet control message protocol (ICMP), SIP, and/or user datagram protocol (UDP)) to a protected node 114 that is operating as a server.

Each of flow record DB 150, host record DB 152, technique catalog 154, and flow record queue 156 can store data structures used by network monitor 102. The data structures can be stored in memory or on persistent storage (such as a file system) that is integrated with network monitor 102, or in a database system that is external to network monitor 102. For example, flow record DB 150, host record DB 152, technique catalog 154, and flow record queue 156 can be stored in a storage device that includes computer system readable media in the form of volatile or non/volatile memory or storage media, such as random access memory (RAM), cache memory, a magnetic disk, an optical disk, etc. The storage device can be accessible by network monitor 102, and can be integrated with or external from network monitor 102.

Network traffic can flow via communications links 120, 122, and 124. In the example shown, network traffic flows to and from external network 116 via wired and/or wireless communication links 120, network traffic flows between network monitor 102 and the protected nodes 114 of the protected network(s) 112 via wired and/or wireless communication links 122, and network traffic flows between tarpit processor 144 and the external network 116 via wired and/or wireless communication link 124.

With reference now to FIGS. 2-5 and 8-12, shown are flowcharts and state flow diagrams demonstrating implementation of the various exemplary embodiments. It is noted that the order of operations shown in FIGS. 2-5 and 8-12 is not required, so in principle, the various operations may be performed out of the illustrated order. Also certain operations may be skipped, different operations may be added or substituted, some operations may be performed in parallel instead of strictly sequentially, or selected operations or groups of operations may be performed in a separate application following the embodiments described herein.

Language that refers to the transfer of information is not meant to be limiting. For example, the term "receive" as used herein refers to obtaining, getting, accessing, retrieving, reading, or getting a transmission. Use of any of these terms is not meant to exclude the other terms. Data that is transferred to or from a module can be transferred by a transmission to or from the module, or can include the data in a location that can be accessed by the module or is provided in a manner to be accessible to another module.

Figure 2:
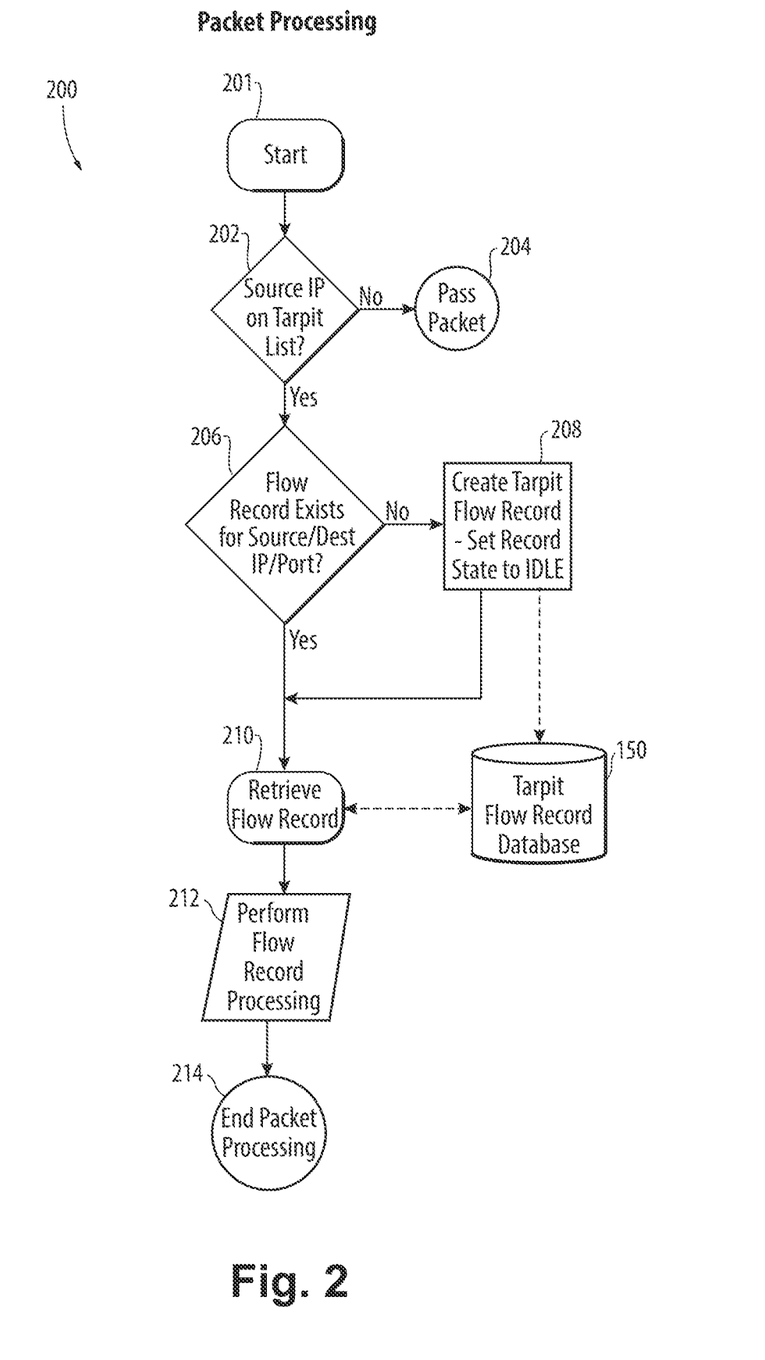
FIG. 2 illustrates a flowchart showing an example method of packet processing, in accordance with an embodiment of the disclosure.

FIG. 2 shows a flowchart 200 of example operations performed by a network monitor, such as packet processor 142 and/or tarpit processor 144 of network monitor 102 shown in FIG. 1, for processing packets. In the example shown, packet processor 142 handles blocks 202-210, and tarpit processor handles block 212. However, it is understood that performance of blocks 202-212 can be divided among packet processor 142 and tarpit processor 144 in a variety of ways.

The method of packet processing begins at block 201. At decision block 202, when a packet is received, the packet processor checks the source IP address of the packet against a tarpit list. The tarpit list can be stored as a data structure in memory or persistent storage (such as a file system) of the network monitor or in a database system that is external to the network monitor. If the determination at block 202 is NO, meaning the packet's source IP address is not included on the tarpit list, then the method continues at block 204, at which the packet is passed to a protected network being protected by the network monitor, such as protected network 112 shown in FIG. 1. If the determination at block 202 is YES, meaning the packet's source IP address is included on the tarpit list, then the method continues at decision block 206, at which the packet is processed by the tarpit processor. The tarpit list can be implemented, for example and without limitation, as a lookup table (LUT) or as an access control list (ACL) with an action for the source IP address set to tarpit (e.g., by the tarpit processor).

At decision block 206, the tarpit processor consults a collection of flow records (e.g., a database), such as flow record DB 150 shown in FIG. 1, and a determination is made whether a flow record exists for the packet. The flow records in the flow record DB can be identified by source and destination IP addresses and port addresses. If the determination at block 206 is that YES, the packet has source and destination IP addresses and port addresses that match a flow record in the flow record DB, the method continues at block 210, at which the matching flow record is retrieved. If the determination at block 206 is that NO, there is no flow record in the flow record DB that matches the packet's source and destination IP addresses and port addresses, the method continues at block 208, at which a flow record is created for the packet (with the source and destination IP addresses and ports of the packet) and added to the flow record DB.

The method then continues at block 210 for retrieving the flow record, after which the method continues at block 212. At block 212 the flow record is processed, which is shown and described in greater detail with respect to FIG. 3. The method of packet processing ends at block 214.

Figure 3:
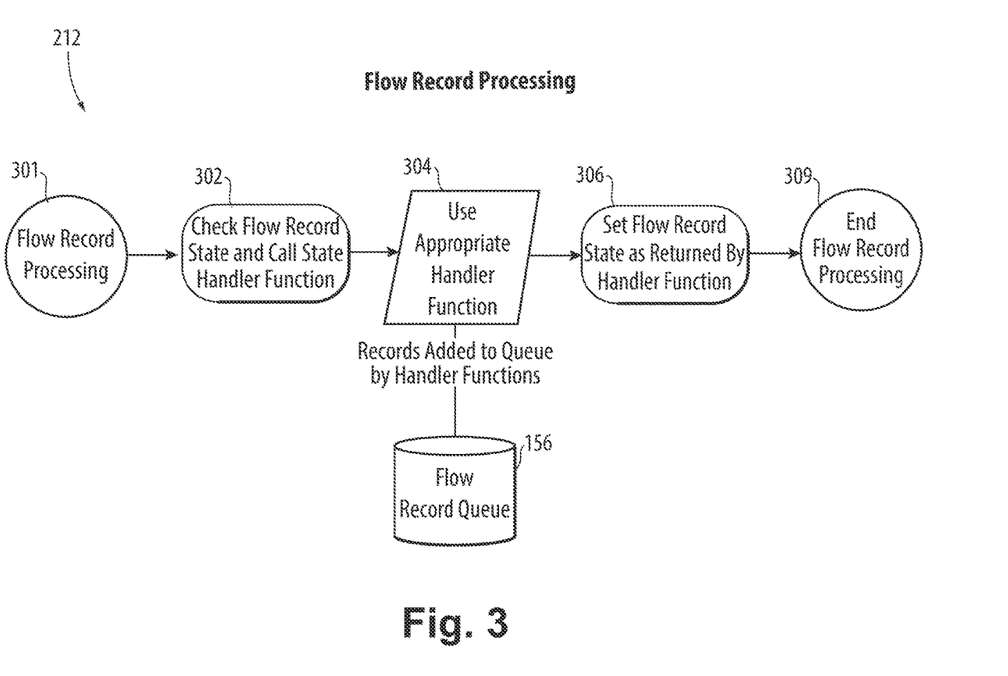
FIG. 3 illustrates a flowchart showing an example method of flow record processing, in accordance with an embodiment of the disclosure.

FIG. 3 shows a flowchart of example operations performed at block 212 of flowchart 200 by a tarpit processor, such as tarpit processor 144 of network monitor 102 shown in FIG. 1, for processing a flow record. The method of processing the flow record begins at block 301. At block 302, a current state of the flow record is determined and a handler that corresponds to the current state is called. At block 304, the handler is called, which is shown and described in greater detail with respect to FIG. 5. Calling the handler can include, for example and without limitation, transmitting or enqueuing transmissions to the external node 130, modifying fields in the flow record to affect future processing, and returning a new state to the caller. At block 306, the current state of the flow record is set to the new state.

Figure 4:
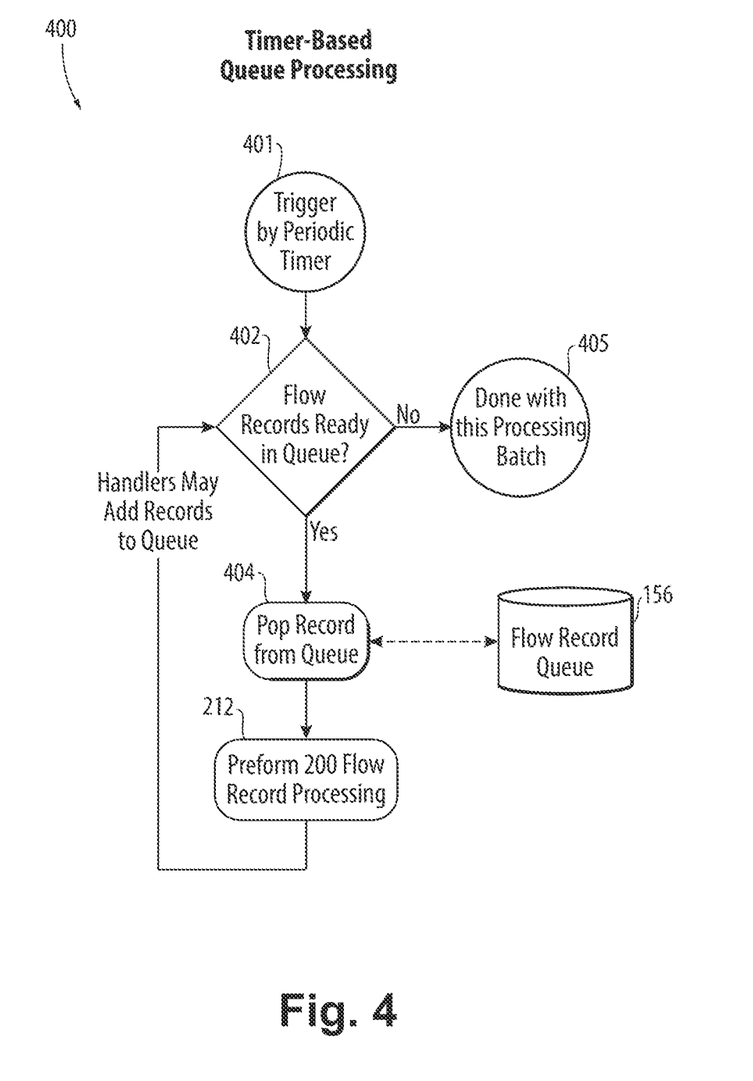
FIG. 4 illustrates a flowchart showing an example method of queue processing, in accordance with an embodiment of the disclosure.

FIG. 4 shows a flowchart 400 of example operations performed by a tarpit processor, such as tarpit processor 144 of network monitor 102 shown in FIG. 1, for processing packets. At block 401, the initiation of the method is triggered periodically by a periodic timer. At block decision 402, a determination is made whether any flow records are ready in a flow record queue, such as flow record queue 156 shown in FIG. 1. A flow record is considered to be ready when it has a timestamp equal to or older than the current time. If the determination at block 402 is NO, meaning there are no flow records ready in the flow record queue, then the method of processing the flow record queue ends at block 405. If the determination at block 402 is YES, meaning there are flow records ready in the flow record queue, then the method continues at block 404. At block 404, the flow record is popped from the flow record queue. Next, block 212 is performed for processing the flow record that was popped, which is shown and described in greater detail with respect to FIG. 3. The method continues to block 402. A loop of blocks 402, 404, and 212 are repeated until there are no further flow records ready in the flow record queue to be processed. It is noted that the flow record queue can be modified during performance of block 212, such as by adding the same record to the flow record queue for replacing the flow record as it was previously stored on the flow record queue with a later time stamp (e.g., for delaying a transmission of the corresponding packet) or for adding an additional instance of the flow record on the flow record queue (e.g., for multiple staggered transmissions of the corresponding packet).

Figure 5:
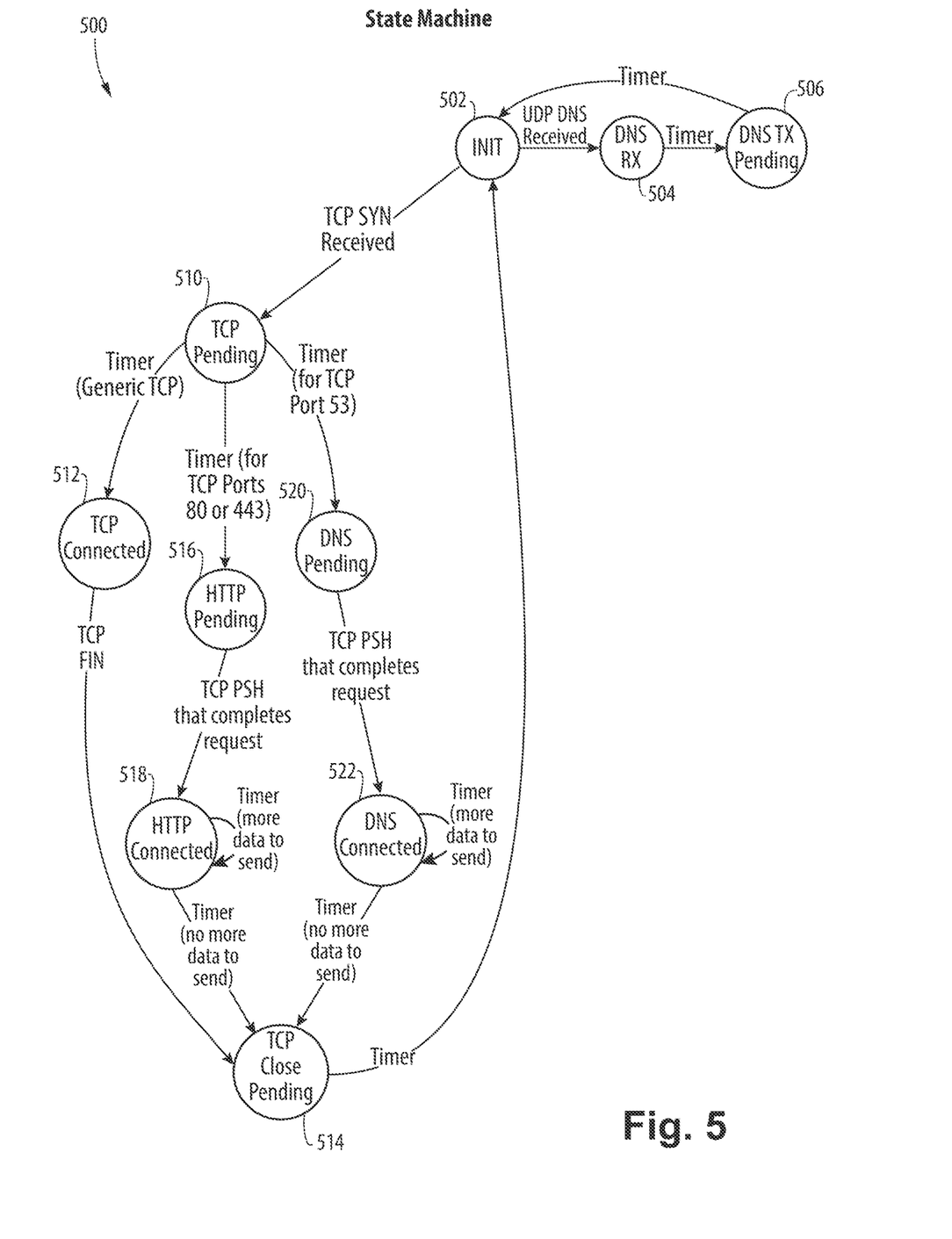
FIG. 5 illustrates a state flow diagram showing example state flow operations performed by an example finite state machine of the tarpit processor of FIG. 1, in accordance with an embodiment of the disclosure.

FIG. 5 shows a state flow diagram 500 of example state flow operations performed by an example finite state machine of tarpit processor, such as tarpit processor 144 of network monitor 102 shown in FIG. 1. At state 502 the state machine is in an initial (INIT) state. In INIT state 502, an INIT handler is called. The function of INIT handler is to determine the next state to return based on the content of the packet. The state machine transitions from INIT state 502 to DNS/RX state 504 upon receipt of a UDP DNS request, or to state TCP pending 510 upon receipt of a TCP/SYN request.

In DNS/RX state 504, a DNS/RX handler 504 is called. This handler selects a response type to generate, either using a preconfigured setting, or by selecting from a random set of response types. For example, DNS/RX handler 504 may generate a malformed DNS response packet, and then prepare (but not send) a packet with fields that have invalid values that are either preconfigured or randomly generated. DNS/RX handler 504 may look up an entry in host record database 152 (shown in FIG. 1) using a source address of the UDP DNS request. If an entry is found in host record database 152, DNS/RX handler 504 may use information in the entry to generate the malformed DNS response packet.

Figure 7:
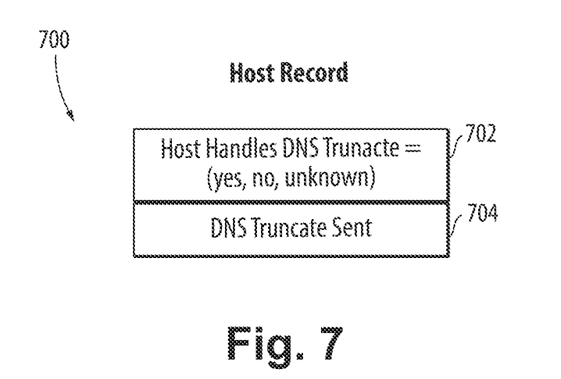
FIG. 7 illustrates an example host record, in accordance with an embodiment of the disclosure.

With additional reference to FIG. 7, an example entry is shown as host record 700 that includes a host handles DNS truncate field 702 and a DNS truncate sent field 704. The fields shown for host record 700 is non-exhaustive, and shown for illustrative purposes only for illustrating some example functions performed. For example, if the host record 700 that was found has a host handles DNS truncate field 702 that is set to "yes", then the DNS/RX handler 504 can generate the DNS response with a "truncate" bit set. If the DNS truncate field 702 field is set to "unknown" and the DNS truncate sent field 704 is set to a value that is below a first threshold value, then DNS/RX handler 504 can generate a DNS response with the truncate bit set. If the DNS truncate sent field 704 is above a second threshold value (wherein the first and second thresholds can be same or can be different), then the DNS/RX handler 504 sets the host handles DNS truncate field 702 to "no".

If the DNS/RX handler 504 generates a DNS response with the truncate bit set, then DNS/RX handler 504 increments the host record's DNS truncate sent field 704. DNS/RX handler 504 selects an interval of time TI in which to send a packet with the DNS response, wherein TI may be a preconfigured time interval or may be randomly selected. DNS/RX handler 504 sets the associated flow record's timestamp to be TI milliseconds in the future.

Turning again to FIG. 5, in response to a timer event, the state transitions from DNS/RX state 504 to DNS/TX pending state 506. In DNS/TX pending state 506, a DNS/TX pending handler is called. This DNS/TX pending handler transmits the response generated in state 504. After running the DNS/TX pending handler, the state transitions back to 502.

In TCP pending state 510, a TCP pending handler is called. TCP pending handler checks to see if the received packet is a DNS packet (port 53), and if so, the TCP pending handler returns a value so that the next state will be state 520. If the received packet is not a DNS packet, TCP pending handler checks to see if the received packet is an HTTP packet (ports 80, 443, etc.) and if so, the TCP pending handler returns a value so that the next state will be state 516. If it is determined that the packet is neither a DNS nor a HTTP packet, then the TCP pending handler returns a value so that the next state will be 512. For all cases, the TCP pending handler selects an interval of time TI in which to send the packet, wherein TI may be a preconfigured interval or may be randomly selected. The TCP pending handler sets the associated flow record's timestamp to be TI milliseconds in the future. For all cases the TCP pending handler generates (but does not send) a response packet. The response packet is configured as a TCP packet that finishes establishing a connection. When a timer event occurs, the state transitions from state 510 to the next state value returned by the TCP pending handler 502.

At TCP connected state 512, a TCP connected handler is called. The TCP connected handler can generate TCP ACK responses when TCP PSH packets are received. From TCP connected state 512, the state machine transitions to TCP close pending state 514 upon receipt of a TCP finish (FIN) request.

At HTTP pending state 516, an HTTP pending handler is called. The HTTP pending handler buffers data from the client when TCP PSH packets are received, and it generates TCP ACK responses. When the HTTP pending handler receives a completed request, it returns state 518 as the next state.

At HTTP connected state 518, an HTTP connected handler is called. When the HTTP connected handler is initially called, it generates an HTTP response buffer containing either a preconfigured or a randomly generate response. The HTTP connected handler generates a packet to send to the client by partially consuming the HTTP response buffer. The HTTP connected handler selects an interval of time TI in which to send the packet, which may be a preconfigured interval or may be randomly selected. The HTTP connected handler sets the associated flow record's timestamp to be TI milliseconds in the future. When the timer event occurs, if there is more data in the buffer, the HTTP connected handler sends the packet, generates a new packet, and selects another time interval TI. The HTTP connected packet handler sets the associated flow record's timestamp to be TI milliseconds in the future. If the buffer is emptied then the HTTP connected handler returns the next state 514.

At DNS pending state 520, a DNS pending handler is called. The DNS pending handler buffers data from the client when TCP PSH packets are received and further generates TCP ACK responses. When the DNS pending handler receives a completed request, the DNS pending handler returns state 522 as the next state. The DNS pending handler also looks up a host record 700 (shown in FIG. 7) in host record database 152 (shown in FIG. 1) using the client's source address. If an entry is found, it sets the host record's host handles DNS truncate field 702 to "yes".

At DNS connected state 522, a DNS connected handler is called. When the DNS connected handler is initially called, it generates a DNS response buffer containing either a preconfigured or a randomly generate response. The DNS connected handler generates a packet to send to the client by partially consuming the DNS response buffer. The DNS connected handler selects an interval of time TI in which to send the packet, wherein TI may be a preconfigured interval or may be randomly selected. The DNS connected handler sets the associated flow record's timestamp to be TI milliseconds in the future. When the timer event occurs, if there is more data in the DNS response buffer, the DNS connected handler sends the packet, generates a new packet, and selects another time interval TI. If the DNS response buffer is emptied, then DNS connected handler returns the next state 514.

Figure 6:
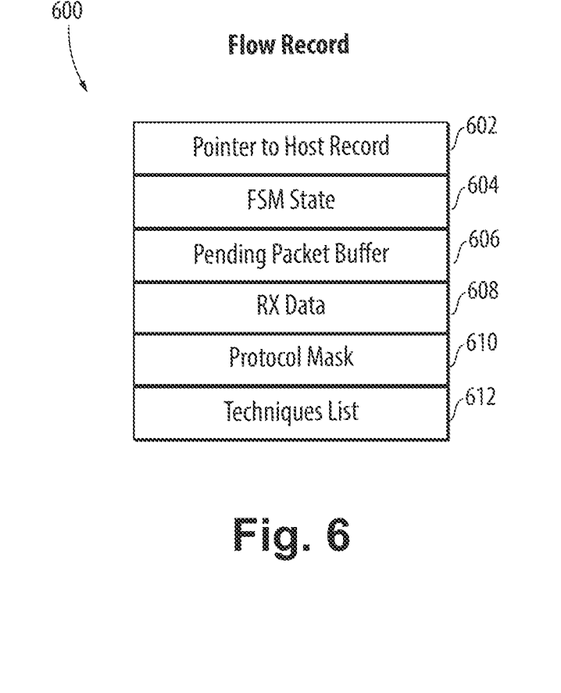
FIG. 6 illustrates an example flow record, in accordance with an embodiment of the disclosure.

FIG. 6 shows an example flow record 600 for a particular flow, wherein each flow has an associated flow record. The flow record 600 includes a number of fields, including: a pointer to host record 602, a finite state machine (FSM) state 604, a pending packet buffer 606, RX data 608, a protocol indicator 610, and a techniques list 612. Pointer to host record 602 stores a pointer that points to a host record 602 stored to include data about the external node 130 (shown in FIG. 1) that was a source of the packets received that belong to the flow record 600. FSM state 604 stores the current state of the state machine for handling the associated flow. Pending packet buffer stores data that tarpit processor 144 is in the process of sending to a connection, for example as described above with reference to state 522. RX data 608 stores data received about a connection, for example as described above with reference to state 520.

Protocol indicator 610 includes a protocol used by the associated flow. Techniques list 612 stores a list of candidate tarpitting techniques that were selected from technique catalogue 154 (shown in FIG. 1). The techniques included in techniques list 612 are selected based on the protocol identified by protocol indicator 610 and a protocol mask associated with each technique included in technique catalogue 154. Technique catalogue 154 stores multiple tarpitting techniques, wherein each of the stored tarpitting techniques have a protocol mask indicative of one or more protocols to which the tarpitting technique is suitable to be applied. The candidate tarpitting techniques selected from technique catalogue 154 each have a protocol mask that matches the protocol indicator 610 of the flow record.

With returned reference to FIG. 7, the example host record 700 is for a host that is an external node 130 (shown in FIG. 1) that has transmitted a request subjected to tarpitting by the tarpit processor 144 (shown in FIG. 1). The host handles DNS truncate field 702 can hold the values of (yes, no, unknown). The DNS truncate sent field 704 is set to a value that is incremented when DNS/RX handler 504 generates a DNS response with the truncate bit set.

Generally, host record 700 is used by network monitor 102 to store information gleaned about a client. In host handles DNS truncate field 702, network monitor 102 can track whether the client has responded properly to a DNS response that the system has sent with the "truncate" bit sent. In the DNS truncate sent field 704, network monitor 102 tracks how many responses have been sent with the truncate bit set, which allows it to later set field 702 based on the subsequent behavior of the client.

Figure 8:
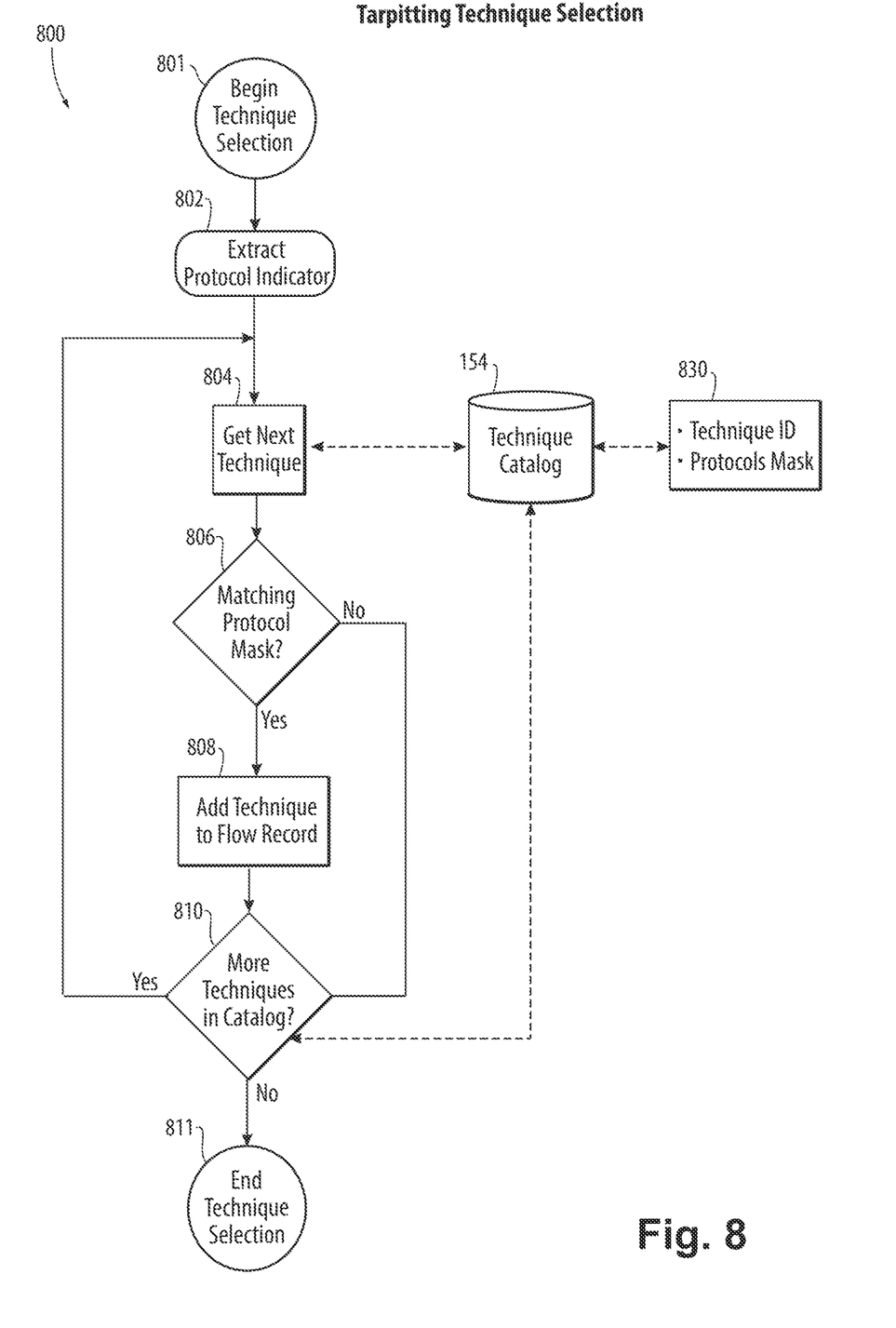
FIG. 8 illustrates a flowchart showing an example method of tarpitting technique selection, in accordance with an embodiment of the disclosure.

FIG. 8 shows a flowchart 800 of example operations performed by an example tarpit processor, such as tarpit processor 144 of network monitor 102 shown in FIG. 1, for selecting candidate tarpitting techniques to associate with a flow record to which a packet received from a client is assigned. The client is also referred to as the source of the packet received or packet source. The method of selecting the candidate tarpitting techniques begins at block 801. At block 802, a protocol indicator, such as protocol indicator 610 shown in FIG. 6, is extracted from the flow record. The protocol indicator indicates a protocol used by the flow record. At block 804, a technique catalog storing multiple tarpitting techniques, such as technique catalog 154 shown in FIG. 1, is accessed. The first technique in the technique catalog is accessed the first time that block 804 is executed. At block 806, a determination is made whether a protocol mask associated with the accessed technique includes the protocol indicated by the protocol indicator. If the determination at block 806 is NO, meaning the protocol mask does not include the protocol indicated by the protocol indicate for the tarpitting technique accessed, then the method continues at block 810. If the determination at block 806 is YES, meaning the protocol mask does include the protocol indicated by the protocol indicate for the tarpitting technique accessed, then the method continues at block 808, followed by block 810.

At block 808, the technique accessed in the technique catalog is added to the flow record as a candidate technique. At block 810, a determination is made whether there are more techniques in the technique catalog to evaluate. If the determination at block 810 is NO, meaning there are no further techniques in the technique catalog to evaluate, then the method ends at block 811. If the determination at block 810 is YES, meaning there are more techniques in the technique catalog to evaluate, then the method returns to block 804 for accessing the next tarpitting technique in the technique catalog. A loop including blocks 804, 806, 808, and 810 are repeated until the method ends at block 811.

With additional reference to FIGS. 1 and 6, in one or more embodiments, the tarpitting techniques are selected and/or modified for a flow record by randomization engine 146. Randomization engine 146 applies a randomization function for generating a random output. The random output can be used to adjust a parameter of the at least one tarpitting technique selected to be applied or to select the tarpitting technique to be applied from the flow record's technique list 612. For example, a technique list for flow records 600 having a protocol identifier 610 that identifies a particular protocol may include five tarpitting techniques identified as T1, T2, T3, T4, and T5.

Each time tarpitting is applied for a different flow record 600 having a protocol identifier 610 that identifies the particular protocol, a different ordered selection of one or more techniques from the flow record 600's technique list 612 can be formed based on the random function. Techniques included in the technique list can be included in the ordered selection more than once or not at all. The selected tarpitting techniques are then applied based on the selection order. Some examples of ordered technique selections from the technique list 612 having tarpitting techniques T1, T2, T3, T4, and T5 include: [T3]; [T3, T4, T5]; [T4, T5, T3]; [T4, T3, T5, T4, T3]; and [T1, T1, T5, T1, T2, T1, T3, T4]. The ordered technique selections can have different lengths, combinations of techniques, and orders. Due to application of the random function for selecting the ordered technique selection, the client will be unable to predict which technique is being applied or which technique will be applied next.

Technique catalog 154 includes at least two different tarpitting techniques. Some tarpitting techniques that can be included in the technique catalog 154 and have protocol masks that include any protocol include, for example, responding to a received packet with a response that is delayed by a selected delay interval and/or responding to the received packet with a selected error message. In one or more embodiments, the parameter adjusted using randomization can be, for example, the selected delay interval or which error message (selected from a predetermined collection of error messages) is sent. When selecting the delay interval, the delays are kept short enough in order that the client would not timeout and send its request again.

Some tarpitting techniques that can be included in the technique catalog 154 and have protocol masks that include transmission control protocol (TCP) include, for example, responding to the received packet with numerous responses that each have a payload containing a small portion of the full response, responding to the received packet with a message having a bad TCP checksum, setting a TCP window size to a selected small value that is inadequate for the client to send a full reply to the response, and/or responding to the received packet with a message that does not include acknowledgement data. In one or more embodiments, the parameter adjusted using randomization can be, for example, a number of bytes and/or a selection of bytes to be included in the small portion. In one or more embodiments, the parameter adjusted using randomization can be, for example, the TCP window size.

Some tarpitting techniques that can be included in the technique catalog 154 and have protocol masks that use domain name system (DNS) and user datagram protocol (UDP) include, for example, responding to the received packet with a response truncated (TC) bit set, wherein the response truncated bit is a specific bit that can be set in a DNS response to indicate that the response has been truncated, and which is intended in this situation to trigger a specific client behavior.

A tarpitting technique that can be included in the technique catalog 154 and has a protocol mask that uses a protocol with an authorization component includes, for example, responding to the received packet with a message that authorization is required or failed. In one or more embodiments, the parameter adjusted using randomization can be, for example, whether the message is that the authorization is required or failed.

A tarpitting technique that can be included in the technique catalog 154 and has a protocol mask that uses hypertext transport protocol (HTTP) includes, for example, responding to the received packet with an error code or a success code, e.g., with a "Content-Length" HTTP header that creates an expectation of a relatively large page body. In this context "relatively large" means a size such that the system can manipulate the client to download slowly enough to keep that client busy with this request for as long as possible, anywhere from several seconds to several hours. When the page body is not advertised with any size, it can be offered as an indefinitely-sized download by failing to provide a "Content-Length" HTTP header. In one or more embodiments, the parameter adjusted using randomization can be, for example, whether the page size is advertised and the page size that is advertised. In another example, the tarpitting technique for use with HTTP can include responding to the received packet with a JavaScript™ link to a JavaScript resource, wherein the JavaScript link or JavaScript resource use a tarpitting technique. In one or more embodiments, the parameter adjusted using randomization can be, for example, a page size of a page including the JavaScript link and/or selection of the tarpitting technique used by the JavaScript link or JavaScript resource.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of network monitor 102 (including packet processor 142 and tarpit processor 144) may be implemented or executed by one or more computer systems. For example, network monitor 102 can be implemented using a computer system such as example computer system 900 illustrated in FIG. 9. In various embodiments, computer system 900 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 900 is only one example of a suitable system and is not intended to suggest any limitation as to the scope of use or functionality of embodiments of the disclosure described herein. Regardless, computer system 900 is capable of being implemented and/or performing any of the functionality set forth hereinabove.

Computer system 900 may be described in the general context of computer system-executable instructions, such as program modules, being executed by a computer system. Generally, program modules may include routines, programs, objects having data and/or functions that can be invoked by data values, classes (wherein the objects (as an instance of a class) and classes form a virtual machine), virtual components, logic, data structures, and so on that perform particular tasks or implement particular abstract data types. Computer system 900 may be practiced in distributed data processing environments where tasks are performed by remote processing devices that are linked through a communications network. In a distributed data processing environment, program modules may be located in both local and remote computer system storage media including memory storage devices.

Computer system 900 is shown in FIG. 9 in the form of a general-purpose computing device. The components of computer system 900 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus or a virtual messaging link like MQ (Message Queuing)

Computer system 900 typically includes a variety of computer system readable media. Such media may be any available media that is accessible by network monitor 102, and it can include both volatile and non-volatile media, removable and non-removable media.

System memory 928 can include computer system readable media in the form of volatile memory, such as random access memory (RAM) 930 and/or cache memory 932. Computer system 900 may further include or access other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the disclosure. In embodiments, flow record DB 150, host record DB 152, technique catalog 154, and/or flow record queue 156 shown in FIG. 1 may be included in memory 928.

Program/utility 940, having a set (at least one) of program modules 915, such as packet processor 142 and tarpit processor 144, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 915 generally carry out the functions and/or methodologies of embodiments of the disclosure as described herein.

Computer system 900 may also communicate with one or more external devices 914 such as a keyboard, a pointing device, a display 924, external storage devices, etc.; one or more devices that enable a user to interact with computer system 900; and/or any devices (e.g., network card, modem, etc.) that enable computer system 900 to communicate with one or more other computing devices. Such communication can occur via Input/Output (I/O) interfaces 922. Still yet, computer system 900 can communicate with one or more networks such as a local area network (LAN), a general wide area network (WAN), and/or a public network (e.g., the Internet) via network adapter 920. As depicted, network adapter 920 communicates with the other components of computer system 900 via bus 918. It should be understood that although not shown, other hardware and/or software components could be used in conjunction with computer system 900. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by network monitor 102 include the ability to combine tarpitting techniques in order to make it harder for an attacker to realize that a defense mechanism is in place and/or to make it harder for the attacker to avoid countermeasures applied. An additional advantage is that the system can alternate between different techniques, both over time and for different attacker source IP addresses, which also presents the same challenges to an attacker. By keeping statistics for each host in the Host Record 700, the system can ensure that it is using the technique or techniques that are most effective against a particular attacker.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A method of monitoring a network during a DDoS attack, the method comprising:
   receiving packets included in the attack;
   determining whether the packets are designated for tarpitting;
   for each packet from a source determined to be designated for tarpitting, assigning the packet to an existing or newly established flow;
   for each newly established flow, establishing a flow record, wherein the flow record stores data that affects timing and/or types of transmissions related to the flow;
   for each flow having a flow record, establishing a state machine configured to change between multiple states, each of the multiple states having an associated handler function;
   invoking the handler function associated with the current state of a flow's state machine, wherein the handler function, upon being invoked, is configured to:
      perform one or more actions associated with the flow or the flow record for applying at least one tarpitting technique of one or more candidate tarpitting techniques associated with the flow record; and
      return a next state;
   updating the current state of the flow's state machine to be the next state returned by the handler function; and
   repeating invocation of the handler function associated with the current state until the current state is a closing state, wherein each invocation of the handler function associated with the current state potentially applies different at least one tarpitting techniques.

2. The method of claim 1, wherein the one or more action includes at least one of transmitting a transmission related to the flow, enqueuing a transmission related to the flow, modification of one or more fields of the flow record for a future transmission related to the flow, and updating counters and/or statistics associated with an action of the one or more actions performed, wherein updates to the counters and/or statistics potentially affect future actions.

3. The method of claim 1, wherein the flow record includes a protocol mask indicative of a protocol used by the flow, and the candidate tarpitting techniques are selected from a catalogue of multiple tarpitting techniques, each of the multiple tarpitting techniques having a protocol indicator indicative of a protocol to which the tarpitting technique is suitable to be applied, wherein the candidate tarpitting techniques selected from the catalogue each have a protocol indicator that matches the protocol mask of the flow record.

4. The method of claim 1, further comprising selecting, using a randomization function, the at least one tarpitting technique from the one or more candidate tarpitting techniques.

5. The method of claim 1, further comprising applying a randomization function for setting a variable applied by the handler function, wherein the variable is associated with adjustment of a parameter associated with the flow or flow record.

6. The method of claim 5, wherein the parameter associated with the flow record includes a timestamp value, wherein the timestamp value indicates a time when a next transmission associated with the flow should be transmitted.

7. The method of claim 6, wherein the handler function associated with the current state of the flow record's state machine is invoked in response to an event, wherein an event is either caused by a timer having a time that matches a timestamp value of the flow record or receipt of a packet of the flow.

8. The method of claim 5, wherein adjustment of the parameter associated with the flow record causes delay of a transmission of a response to a received packet, wherein the parameter is adjusted for the delay to be less than a value that would trigger a client timeout.

9. The method of claim 1, wherein the one or more action includes updating counters and/or statistics associated with a host record, the host record being associated with an IP address of a source of the packet, and updating counters and/or statistics associated with the host record affecting treatment of the packet and/or future treatment of packets received from the host record in the future.

10. The method of claim 1, wherein the multiple tarpitting techniques include two or more of:
   responding to the received packet with a response that is delayed by a selected delay interval;
   responding to the received packet with a selected error message;
   wherein when a packet of the packets received uses transmission control protocol (TCP):
      responding to the received packet with numerous responses each having a small portion of the full response;
      responding to the received packet with a message having a bad TCP checksum;

setting a TCP window size to a selected small value; and/or responding to the received packet with a message that does not include acknowledgement data;

wherein when a packet of the packets received uses domain name system (DNS) and the received packet is a query that uses user datagram protocol (UDP), responding to the received packet with a truncated response;

wherein when a packet of the packets received uses a protocol with an authorization component, responding to the received packet with a message that authorization is required or failed; and wherein when a packet of the packets received uses hypertext transport protocol (HTTP):

responding to the received packet with an error code or a success code and a page body with a relatively large content-length;

responding to the received packet with an error code or a success code and a page body without a content-length such that such page is of an indefinite size; and/or responding to the received packet with a JavaScript link to a JavaScript resource, wherein the JavaScript link or JavaScript resource use a tarpitting technique.

11. The method of claim 5, wherein the multiple tarpitting techniques include two or more of:

responding to the received packet with a response that is delayed by a selected delay interval and the parameter adjusted is the selected delay interval;

responding to the received packet with a selected error message and the parameter adjusted is which error message, selected from a predetermined collection of error messages, is sent;

wherein when a packet of the packets received uses TCP:

responding to the received packet with numerous responses each having a small portion of the full response, and the parameter adjusted is a number of bytes and/or a selection of which bytes to be included in the small portion; and/or setting a TCP window size to a selected small value, and the parameter adjusted is the TCP window size;

wherein when a packet of the packets received uses a protocol with an authorization component, responding to the received packet with a message that authorization is required or failed, and the parameter adjusted is whether the message is that the authorization is required or failed; and wherein when a packet of the packets received uses HTTP:

responding to the received packet with an error code or a success code and an advertised or unadvertised page body that creates an expectation of a relatively large page body, and the parameter adjusted is whether the page body size is advertised and the page body size advertised, when advertised; and/or responding to the received packet with a JavaScript link to a JavaScript resource, wherein the JavaScript link or JavaScript resource use a tarpitting technique, and the parameter adjusted is a page size of a page including the JavaScript link and/or selection of the tarpitting technique used by the JavaScript link or JavaScript resource.

12. A network monitor for monitoring a network during a DDoS attack, the network monitor comprising:

a memory configured to store instructions;

at least one processing device disposed at the location and in communication with the memory, wherein the at least one processing device upon execution of the instructions is configured to:

receive packets included in the attack;

determine whether the packets are designated for tarpitting;

for each packet from a source determined to be designated for tarpitting, assign the packet to an existing or newly established flow;

for each newly established flow, establish a flow record, wherein the flow record stores data that affects timing and/or types of transmissions related to the flow;

for each flow having a flow record, establish a state machine configured to change between multiple states, each of the multiple states having an associated handler function;

invoke the handler function associated with the current state of a flow's state machine, wherein the handler function, upon being invoked, is configured to:

perform one or more actions associated with the flow or the flow record for applying at least one tarpitting technique of one or more candidate tarpitting techniques associated with the flow record; and return a next state;

update the current state of the flow's state machine to be the next state returned by the handler function; and repeating invocation of the handler function associated with the current state until the current state is a closing state, wherein each invocation of the handler function associated with the current state potentially applies different at least one tarpitting techniques.

13. The network monitor of claim 12, wherein the one or more action includes at least one of transmitting a transmission related to the flow, enqueuing a transmission related to the flow, modification of one or more fields of the flow record for a future transmission related to the flow, and updating counters and/or statistics associated with an action of the one or more actions performed, wherein updates to the counters and/or statistics potentially affect future actions.

14. The network monitor of claim 12, wherein the flow record includes a protocol mask indicative of a protocol used by the flow, and the candidate tarpitting techniques are selected from a catalogue of multiple tarpitting techniques, each of the multiple tarpitting techniques having a protocol indicator indicative of a protocol to which the tarpitting technique is suitable to be applied, wherein the candidate tarpitting techniques selected from the catalogue each have a protocol indicator that matches the protocol mask of the flow record.

15. The network monitor of claim 12, wherein the at least one processing device upon execution of the instructions is further configured to select, using a randomization function, the at least one tarpitting technique from the one or more candidate tarpitting techniques.

16. The network monitor of claim 12, wherein the at least one processing device upon execution of the instructions is further configured to apply a randomization function for setting a variable applied by the handler function, wherein the variable is associated with adjustment of a parameter associated with the flow or flow record.

17. The network monitor of claim 16, wherein the parameter associated with the flow record includes a timestamp value, wherein the timestamp value indicates a time when a next transmission associated with the flow should be transmitted.

18. The network monitor of claim 17, wherein the handler function associated with the current state of the flow's state machine is invoked in response to an event, wherein an event is either caused by a timer having a time that matches a timestamp value of the flow record or receipt of a packet of the flow.

19. The network monitor of claim 16, wherein adjustment of the parameter associated with the flow record causes delay of a transmission of a response to a received packet, wherein the parameter is adjusted for the delay to be less than a value that would trigger a client timeout.

20. The network monitor of claim 12, wherein the one or more action includes updating counters and/or statistics associated with a host record, the host record being associated with an IP address of a source of the packet, and updating counters and/or statistics associated with the host record affecting treatment of the packet and/or future treatment of packets received from the host record in the future.

21. The network monitor of claim 12,
wherein the multiple tarpitting techniques include two or more of:
responding to the received packet with a response that is delayed by a selected delay interval;
responding to the received packet with a selected error message;
wherein when a packet of the packets received uses transmission control protocol (TCP):
responding to the received packet with numerous responses each having a small portion of the full response;
responding to the received packet with a message having a bad TCP checksum;
setting a TCP window size to a selected small value; and/or
responding to the received packet with a message that does not include acknowledgement data;
wherein when a packet of the packets received uses domain name system (DNS) and the received packet is a query that uses user datagram protocol (UDP), responding to the received packet with a truncated response;
wherein when a packet of the packets received uses a protocol with an authorization component, responding to the received packet with a message that authorization is required or failed; and
wherein when a packet of the packets received uses hypertext transport protocol (HTTP):
responding to the received packet with an error code or a success code and a page body with a relatively large content-length; and/or
responding to the received packet with an error code or a success code and a page body without a content-length such that such page is of an indefinite size; and/or
responding to the received packet with a JavaScript link to a JavaScript resource, wherein the JavaScript link or JavaScript resource use a tarpitting technique.

22. The network monitor of claim 16, wherein the multiple tarpitting techniques include two or more of:
responding to the received packet with a response that is delayed by a selected delay interval and the parameter adjusted is the selected delay interval;
responding to the received packet with a selected error message and the parameter adjusted is which error message, selected from a predetermined collection of error messages, is sent;
wherein when a packet of the packets received uses TCP:
responding to the received packet with numerous responses each having a small portion of the full response, and the parameter adjusted is a number of bytes and/or a selection of which bytes to be included in the small portion; and/or
setting a TCP window size to a selected small value, and the parameter adjusted is the TCP window size;
wherein when a packet of the packets received uses a protocol with an authorization component, responding to the received packet with a message that authorization is required or failed, and the parameter adjusted is whether the message is that the authorization is required or failed; and
wherein when a packet of the packets received uses HTTP:
responding to the received packet with an error code or a success code and an advertised or unadvertised page body that creates an expectation of a relatively large page body, and the parameter adjusted is whether the page body size is advertised and the page body size advertised, when advertised; and/or
responding to the received packet with a JavaScript link to a JavaScript resource, wherein the JavaScript link or JavaScript resource use a tarpitting technique, and the parameter adjusted is a page size of a page including the JavaScript link and/or selection of the tarpitting technique used by the JavaScript link or JavaScript resource.

* * * * *